Feb. 15, 1966 J. K. SHANNON 3,235,412
STORAGE BATTERY
Original Filed Aug. 18, 1960
2 Sheets-Sheet 1

INVENTOR
JOHN K. SHANNON

BY Wright and Wright

ATTORNEYS

Feb. 15, 1966 J. K. SHANNON 3,235,412
STORAGE BATTERY
Original Filed Aug. 18, 1960 2 Sheets-Sheet 2
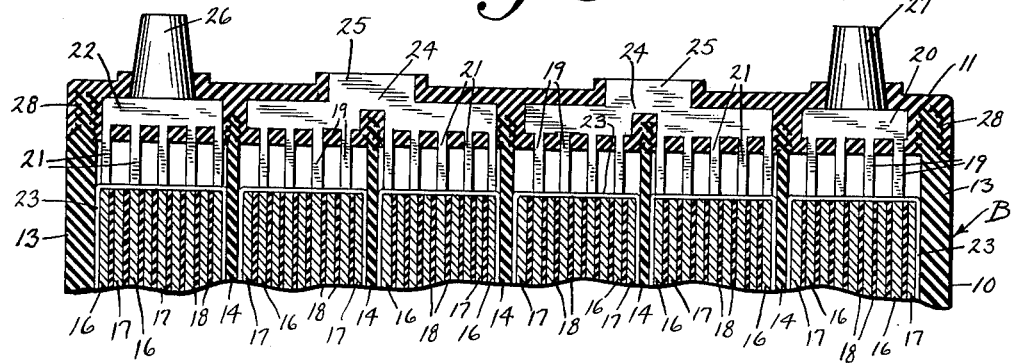
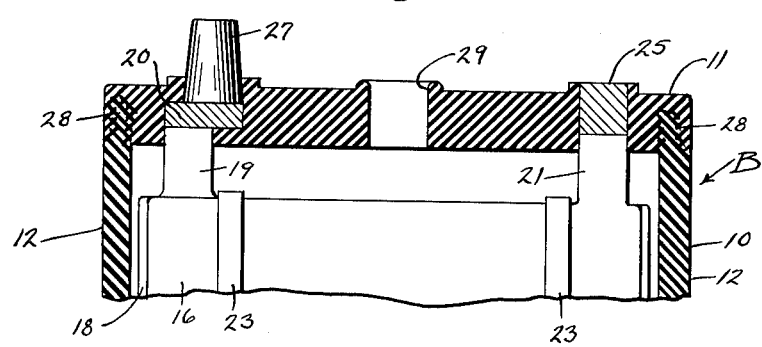
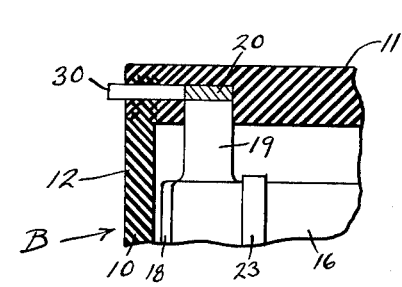
INVENTOR
JOHN K. SHANNON
BY Wright and Wright
ATTORNEYS United States Patent Office 3,235,412
Patented Feb. 15, 1966

3,235,412
STORAGE BATTERY
John K. Shannon, 2028 63rd Place, Kenosha, Wis.
Original application Aug. 18, 1960, Ser. No. 50,443, now Patent No. 3,120,572, dated Feb. 4, 1964. Divided and this application July 10, 1961, Ser. No. 122,750
2 Claims. (Cl. 136—170)

This invention appertains to storage batteries and more particularly to a novel storage battery case and cover and is a division of my co-pending application, Serial No. 50,443 filed August 18, 1960, now Patent No. 3,120,572 and entitled "One-Piece Molded Battery Cover."

As brought out in my co-pending application it is customary to provide a premolded battery cover to fit into or over the edges of the battery cell case or container. A groove is usually provided between the cover and the case wherein a thermoplastic or thermosetting sealant is applied which secures the cover to the case and prevents leakage of the electrolyte. Normally, the cover section of each cell is provided with a vent well, neck or filling opening which has been molded into the cover and such openings have threads or other means for securing vent caps or closures in place. The plate lug shoulders are below the inner face of the cover and the shoulders are usually enveloped by the electrolyte and the gases of the cells.

It is one of the primary objects of my present invention to provide a storage battery embodying a case having molded directly thereon a cover formed from a molten material compatible with the material from which the preformed case is made, whereby an integral homogeneous whole will be had and thus provide for the proper protection of the battery plates and the prevention of the seeping of the electrolyte between the cover and the case, and thereby eliminate the forming of separate battery covers and a sealant for securing the premolded cover in place.

Another salient object of my invention is to provide a storage battery having an integral case and cover with the jump straps for the cells and the shoulders or connectors for the lugs of the plate sets all embedded within the cover during the molding thereof on the case, whereby said straps, shoulders and connectors for the lugs of the plates will be effectively insulated and protected from any deleterious action of the battery acid and gases thereon and whereby the plates will be efficiently supported by the cover.

In my copending parent case, the method and means of molding the cover on the case is fully shown, described and claimed.

Another further object of my invention is the provision of means whereby test points will be provided for the cells, with the points molded within the cover.

With these and other objects in view, the invention consists in the novel arrangement, formation and construction of parts, as will be hereinafter more specifically described and claimed, and illustrated in the accompanying drawings, in which drawings, FIGURE 1 is a perspective view of a complete battery constructed in accordance with my invention;

FIGURE 3 is a view similar to FIGURE 2 with the cover molded on the case and enveloping the lug connectors and shoulders, the section being taken on the line 3—3 of FIGURE 1, looking in the direction of the arrows;

FIGURE 4 is a fragmentary transverse sectional view through the battery taken on the line 4—4 of FIGURE 1, looking in the direction of the arrows and showing a vent opening for a cell, and FIGURE 5 is a fragmentary detail sectional view through a slightly modified form of battery.

Referring to the drawings in detail wherein similar reference characters designate corresponding parts throughout the several views, the letter B generally indicates a storage battery embodying the novel features of the invention.

Figure 1:
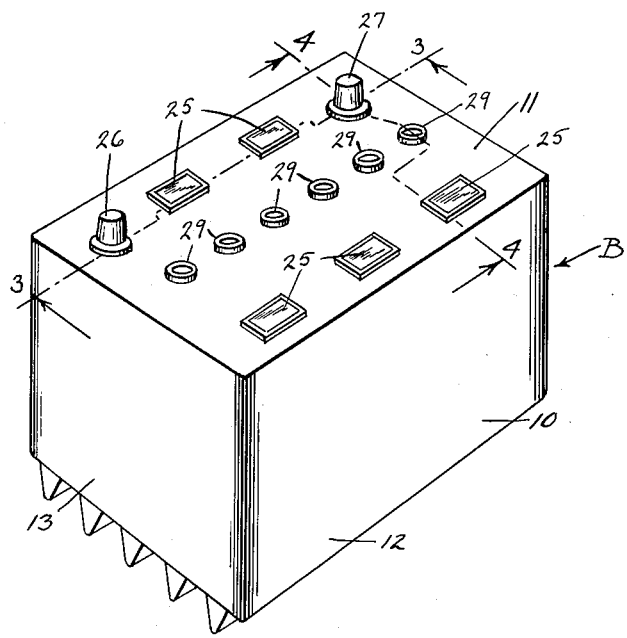
Figure 2:
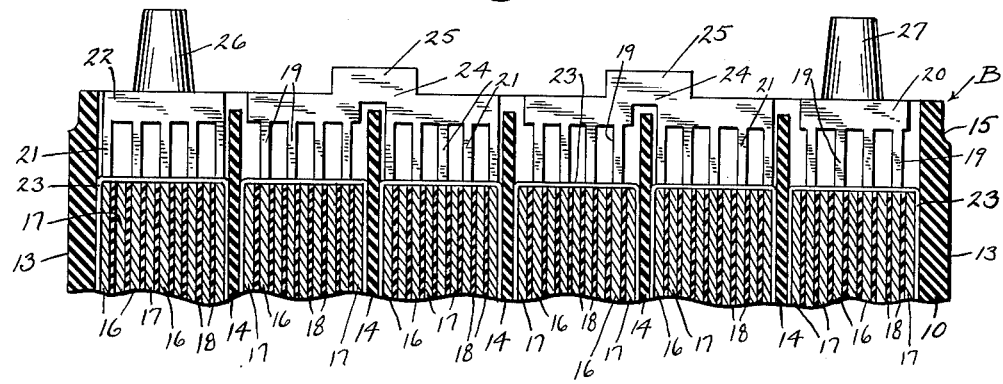
FIGURE 2 is a fragmentary longitudinal sectional view through a battery prior to the molding of the cover thereon.

As illustrated, the storage battery B includes a premolded case or container 10 having molded thereon a cover 11.

The battery case 10 can be molded from hard rubber or any other preferable type of plastic material and is substantially of the same character as now employed in storage batteries on the market. Thus, the case includes side walls 12 and end walls 13. The side walls 12 are connected by transversely extending partitions 14, which form the individual cells.

As illustrated, a six cell battery has been indicated, but it is to be understood that more or less cells can be employed. While I have stated that the case 10 is of substantially the same character as employed in storage batteries now on the market and in general use, it is to be understood that in accordance with my invention the upper edges of the side and end walls 12 and 13 are formed in such a way as to insure the proper molding of the cover 11 thereon and so that the cover and case will be correctly united to form a substantially homogeneous unit. Thus, the upper edges of the side and end walls 12 and 13 are reduced in thickness to provide a peripheral groove or seat 15. While I have shown this seat 15 formed on the exterior face of the case, it is to be understood that the seat could be formed on the inner face of the case.

Each cell of the battery B receives a set of positive and negative plates 16 and 17. As is customary, the sets of plates 16 and 17 are held in a proper spaced position by separators 18. The plates of the negative set 17 have their lugs 19 joined by shoulders or connectors 20. The set of positive plates have their lugs 21 joined by shoulders or connectors 22. The sets of plates and separators are preferably joined together by bands 23. The positive set of plates of one cell is connected to the negative set of plates of an adjacent cell by jump straps 24. These jump straps 24 are preferably, but not necessarily, formed with bosses 25 for a purpose, which will be later set forth. It is to be noted that where these bosses are utilized, that the same form test points for cells and this is best shown in FIGURES 1 and 3. The end cells of the battery are provided with terminal posts 26 and 27. The terminal post 27 is carried by and electrically connected with a negative set of plates and the terminal post 26 is carried by and electrically connected with a positive set of plates. The terminal posts 26 and 27 project a material distance beyond the upper edges of the walls of the case.

The cover 11 is molded directly on the upper edge of the case while the material of the cover is initially in a molten state and this molding process, is, as stated, shown and described in my parent application. However, it is to be understood that a mold plate is provided having a cavity in its upper face for snugly receiving the upper edge of the battery case during the molding process. While I have shown the battery case with its sets of battery plates in a normally upright position, it is to be understood that in the molding process the groups of plates are inverted and placed in proper spaced relation in the mold plate cavity, and that the cavity is then filled with the battery cover material in a molten state, after which the battery case also in an inverted position is moved over the group of cell plates with its grooved edge immersed in the molten material. The molten material is of such a height in the mold plate cavity as to envelope the shoulders and jump straps. Thus, upon the hardening of the cover material the same will be molded on the case and the connector and jump straps will be embedded in the cover material.

Obviously, the plastic material from which the cover is formed will flow around and into the groove or reduced portion 15 of the case walls.

The plastic material from which the cover 11 can be made, by way of example, can be hard rubber, polyethylene, an epoxy resin, or the like, and is of a material which is compatible with the material from which the battery case 10 is made, so that when the material from which the cover is formed solidifies, the cover and battery case will form an integral homogeneous unit.

The uniting of the cover material with the material from which the case is formed is indicated by the reference character 28. The union of the material of the cover and material of the case is such that when the battery is completed the case and cover give the appearance of a smooth, continuous unit, as best shown in FIGURE 1. During the molding of the cover the bosses or test points 25 rest on the bottom wall of the mold cavity plate and hence these test points 24 are flush with the outer wall of the cover and are exposed to view. However, if such should be desired the bosses 25 can be slightly spaced from the bottom wall of the cavity so that a thin membrane of the plastic material will flow over the outer faces of the test points or bosses 25. Also during the molding step filling and vent openings 29 are provided for each cell and these openings are closed by any preferred type of vent cap (not shown).

In lieu of having the terminal post protruding through the outer face of the cover, the same can project laterally out of the cover, as is indicated by the reference character 30 in FIGURE 5 of the drawings.

While I have shown the preferred form of my integral cover and case in the drawings, it is to be understood that the shoulders or connectors 20 need not be embedded within the cover during the molding thereof. However, in all instances, it is preferred to have the jump straps 24 embedded in the cover.

From the foregoing description, it can be seen that I have provided a battery having an integrally united case and cover with shoulders and jump straps embedded in the material from which the cover is formed.

Changes in details may be made without departing from the spirit or the scope of this invention, but what I claim as new is:

1. A storage battery comprising a case having cells, battery plate sets including separators in each cell, shoulders connecting like plate sets together, jump straps connecting the plates of adjacent cells together, terminal posts for certain plate sets, and a cover molded on the upper edge of the case enveloping the shoulders, cell connector straps, shoulder connector straps, and portions of the terminal posts.

2. A storage battery comprising a case having cells, battery plate sets including separators in each cell, shoulders connecting like plate sets together, jump straps connecting the plates of adjacent cells together, terminal posts electrically connected to sets of plates, and a cover molded on the upper edge of the case and integral therewith and enveloping the jump straps and portions of the terminal posts.

References Cited by the Examiner

UNITED STATES PATENTS

| | | | |
|---|---|---|---|
| 1,784,216 | 12/1930 | Aldrich et al. | 136—170.1 |
| 1,907,420 | 5/1933 | Finn | 136—134.5 |
| 2,886,622 | 5/1959 | Shannon | 136—170 |

FOREIGN PATENTS

| | | |
|---|---|---|
| 510,238 | 7/1939 | Great Britain. |
| 748,719 | 5/1956 | Great Britain. |

WINSTON A. DOUGLAS, *Primary Examiner.*

JOHN R. SPECK, JOHN H. MACK, *Examiners.*